2,971,498

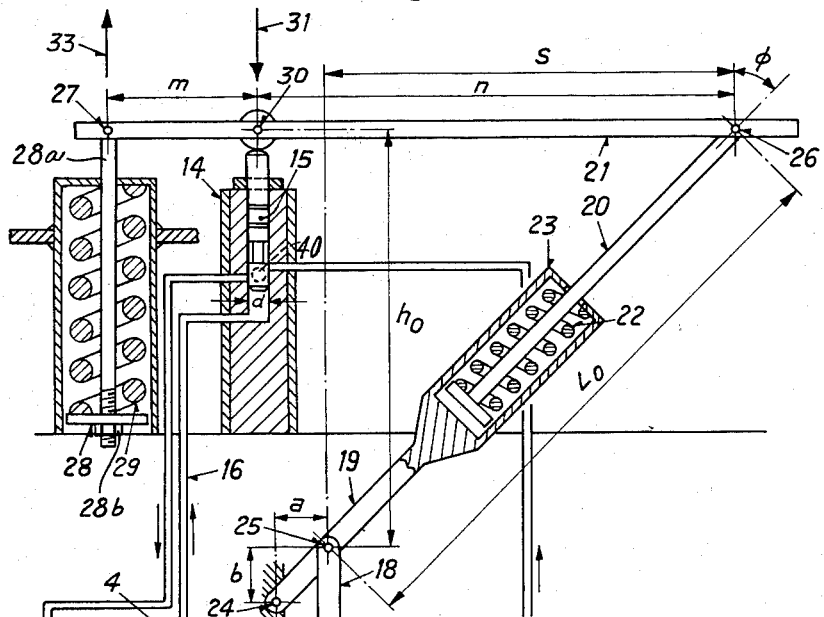
Fig. 1
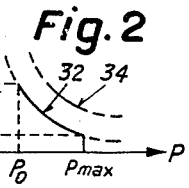
Fig. 2
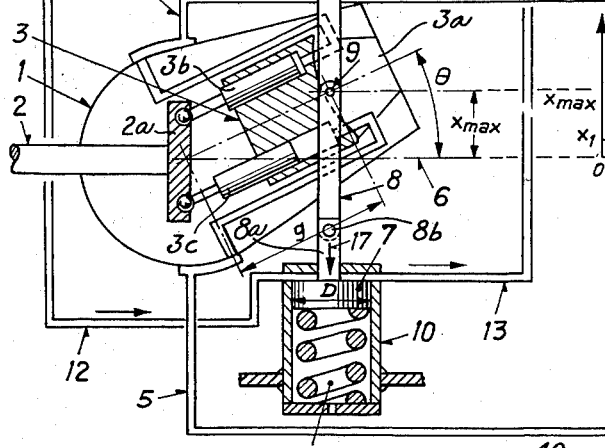
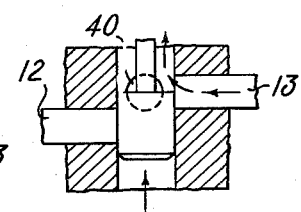
Fig. 3
Fig. 4
Fig. 5
INVENTOR.
PETER BLOCH

United States Patent Office 2,971,498
Patented Feb. 14, 1961

HYDRAULIC CONTROL DEVICE FOR A
HYDROSTATIC DRIVE

Peter Bloch, Solothurn, Switzerland, assignor to Gesellschaft der Ludw. von Roll'schen Eisenwerke A.G., Gerlafingen, Switzerland Filed Feb. 20, 1957, Ser. No. 641,347

Claims priority, application Switzerland Feb. 21, 1956

2 Claims. (Cl. 121—41)

The present invention relates to a hydraulic control means for controlling a hydrostatic drive such as an axial displacement pump used, for example, to transmit power in a controlled manner from an electric or diesel motor to the drive shaft of a vehicle such as a locomotive or the like.

With a transmission of this type it is often desired to maintain the power delivered from the prime mover, such as the electric or diesel motor, to the pump at a constant level, so that the prime mover may always operate at peak efficiency.

Since the power N consumed by such pump is proportional to the product of the amount of fluid Q delivered by the pump and the pressure $p$ of this working fluid, a constant power N supplied to such a pump requires that Q be proportional to $1/p$.

In a diagram where the pressure $p$ is the abscissa and the delivered fluid Q is the ordinate, the curve of N, where the latter is a constant, is a hyperbola symmetrical with the point of origin of the abscissa and ordinate. Of course, the limitations of a particular construction necessitate a maximum permissible pressure $p_{max}$ which upon lessening of Q up to zero, for example, should not be exceeded, and furthermore, the maximum possible delivery of fluid $Q_{max}$ should not take place below a predetermined minimum pressure $p_0$.

To maintain the desired operating conditions with a constant power N supplied to the pump, a control device having a hyperbolic characteristic can be used, and such a control device may include a spring loaded hydraulic piston for turning the housing of the hydrostatic axial displacement pump so as to influence the amount of fluid delivered thereby. In the event that the operating pressure $p$ of the pump acts on this piston and the spring force opposing the pressure increases hyperbolically as the piston moves, then the angular movement of the pump takes place in such a way that within a given control range the amount of fluid delivered Q varies proportionally with $1/p$, so that N actually remains constant. A spring with hyperbolic characteristics can be provided in a known way by arranging axially behind one another several spring members of different materials and having convolutions of different diameters.

A control device with a hyperbolic controlling characteristic is not completely satisfactory, however, because it is very difficult to change the control characteristic, and when a certain maximum permissible pressure $p_{max}$ is reached, a response is required of a safety valve which is of little reliability during operation over a long period of time. Furthermore, an undesirable heating of the oil or like medium serving as the working fluid cannot be avoided.

One of the objects of the present invention is to provide means avoiding the above-mentioned drawbacks and affording the control characteristic to be easily and positively changed.

Another object of the present invention is to provide means facilitating the elimination of any difficulties when a maximum pressure is reached.

A further object of the present invention is to provide means preventing undesirable heating of the working fluid or medium during long operation.

The above and other objects of the invention will become further apparent from the following detailed description, reference being made to the accompanying drawing, showing a preferred embodiment of the invention.

In the drawing:

Fig. 1 schematically illustrates one possible embodiment of a structure according to the invention;

Fig. 2 shows a diagram of the manner of operation of the structure of the invention;

Fig. 3 shows schematically one position of a control piston employed in the invention;

Fig. 4 shows likewise schematically the aforesaid control piston in another position; and Fig. 5 shows a slidable and regulatable pivot connection for the lever means referred to in the specification.

As is schematically illustrated in Fig. 1, a swash plate pump 1 is driven by a drive shaft 2 which is in turn driven by a prime mover such as an electrical motor or a diesel engine. The cylinder block 3 of the pump communicates with a high pressure conduit 4 to which fluid under pressure is delivered by the pump and with a low pressure or suction conduit 5 which supplies fluid to the pump, the high pressure fluid being used to drive a vehicle, for example. The pump 1 is mounted for turning movement through an angle $\theta$ with respect to an axis of symmetry 6.

A hydraulic moving means is provided for turning the pump, and this hydraulic moving means includes a piston 7 of relatively large diameter D. The piston rod 8 of the piston 7 is connected to a pivot pin 9 fixed to the pump 1, and the piston 7 reciprocates in a cylinder 10 and is acted upon by a pressure spring 11 in the cylinder 10. The conduits 12 and 13 place the interior of the cylinder 10 and the piston 7 under the influence of the pressure of the fluid in a cylinder 14 of a hydraulic control or measuring means which includes a control piston 15 of relatively small diameter $d$, this piston 15 being acted upon by the high pressure fluid in the conduit 4 through a conduit 16 communicating with the conduit 4 and the interior of the cylinder 14.

When the pressure of the fluid in conduits 12 and 13 is greater than the opposing force of the pressure spring 11, then the piston rod 8 shifts in the direction of arrow 17 substantially perpendicularly to the axis of symmetry 6 so as to turn the pump in a direction which causes the angle $\theta$ to approach zero, and the rod 8 must move through a distance determined by the turning angle $\theta$ and the distance $g$ between the turning axis of the pump housing and the point 9, so that the distance through which the rod 8 moves is equal to $g \sin \theta$. This latter value is proportional to the amount of fluid Q delivered by the pump.

A linkage means interconnects the hydraulic moving means 7—10 with the hydraulic measuring means 14—16, and this linkage means, which actually serves as a mechanical coupling between pistons 7 and 15, includes the arms 18 and 21 and a resilient lever means composed of the coaxial arms 19 and 20 and a spring means 22, 23 which resists lengthening of the lever means 19, 20, this lever means being inclined to the arms 18 and 21 which form the remainder of the linkage means. The lever means, which includes the hollow housing portion 23 of the arm 19 in which the spring 22 acts upon an enlarged end of the arm 20, is pivotally mounted at one end for turning movement about a stationary axis determined by the stationary pivot 24. The arm 18, which is pivotally connected at 9 to the piston rod 8, is pivotally connected at 25 to the lever means 19, 20, the pivotal connection 25 being located adjacent to the stationary pivot 24.

The angle $\phi$ between the axis of lever means 19, 20 and a line perpendicular to the arm 21 is determined by the coordinates $a$ and $b$ between the stationary pivot 24 and the pivotal connection 25. The transverse arm 21 of the linkage means is pivotally connected adjacent one end at 26 to the end of the lever means 19, 20 distant from the pivot 24, and the opposite end of the arm 21 is pivotally supported by a bearing 27 carried by a spring-pressed piston and cylinder means which includes the piston 28 and the spring 29 acting thereon. The spring 29 is of considerable strength and maintains the bearing 27 in the illustrated position. Through a suitable roller or the like the arm 21 acts at point 30 on the measuring piston 15, and this point 30 is at a distance $m$ from the turning axis provided by the bearing 27 and at a distance $n$ from the pivotal connection 26.

The position of the pump 1 illustrated in Fig. 1 corresponds to the maximum possible value of the turning angle $\theta_{max}$ so that in this position the greatest amount of fluid $Q_{max}$ is delivered at the minimum pressure $p_0$ in the high pressure conduit 4. The distance between points 25 and 30 is designated by $h_0$ and the length of the inclined lever means 19, 20, when the distance between points 25 and 30 is $h_0$, is indicated by the distance $L_0$ between the points 25 and 26, the distance between points 25 and 26 in a direction perpendicular to $h_0$ being indicated at $s$.

From these dimensions of the linkage means interconnecting the pistons 7 and 15 it is possible with certain permissible simplifications to determine the pressure $P_M$ applied to the piston 15 in the direction of arrow 31 in dependence upon the stroke $x$ of piston 7 from:

$$P_M = \frac{m+n}{m} \cdot k \cdot (q-x)$$
$$+ \frac{m+n}{m}(R_0 - k \cdot L_0) \cdot \left(1 - \frac{1}{2}Z + \frac{3}{8}Z^2 - \ldots\right)$$

wherein $k$ equals a spring constant of the spring 22;

$$q = b + h_0$$
$$R_0 = p_0 \cdot \frac{L_0}{h_0} \cdot \frac{m}{m+n}$$
$$Z^2 = \frac{f - \sqrt{r^2 - x^2}}{q - x}$$
$$f = s + a$$
$$r^2 = a^2 + b^2$$

From the above it is apparent that the load $P_M$ acting on the measuring piston 15 approaches closely a hyperbolic function of the stroke $x$ of the piston 7, as long as the bearing 27 maintains its position under the influence of the spring 29. During turning of the pump 1 downwardly from the maximum angular position $\theta_{max}$ until the pressure reaches a predetermined maximum value $p_{max}$ determined by spring 29, the desired hyperbolic control curve $Q = f(p)$ is obtained. Fig. 2 shows this control curve from an end position $x_{max}$ of piston 7 through a stroke to position $x_1$ where the highest permissible pressure $p_{max}$ occurs, this curve being shown by the line 32.

If the piston continues to move so as to move to a position having a value $x$ less than $x_1$, then the pressure $P_M$ acting in the direction of arrow 31 and thus the pull on the bearing 27 in the direction of arrow 33 is greater than the force of the spring 29, so that the bearing 27 of the arm 21 shifts in the direction of arrow 33, and this action prevents in cooperation with the piston 15 the pressure from exceeding $p_{max}$, so that the control device in the region between $x_1$ and a value of $x$ equal to 0 does not provide a constant power supply N for the pump 1 and instead operates at a constant maximum pressure $p_{max}$, which is desired.

The pivot pin 24 may be adjustably supported in any suitable way for shifting movement parallel to the arm 21, so that the control curve 32 of Fig. 2 is shifted while remaining parallel to its original position so as to take, for example, the position indicated by the curve 34 which corresponds to a higher power supply N than the line 32. Also, by adjusting the pre-stressing of the spring 29 acting on piston 28, the maximum pressure $p_{max}$ can be changed.

The above-described control device has been tested in an actual example with a pump having a constant power supply of N equal to 84 H.P. while the drive shaft 2 was rotating at a speed of 970 r.p.m. A maximum stroke $x_{max}$ of 63.5 mm. for a piston 7 having a diameter D equal to 40 mm. produced in a turning range from $x_{max}$ to a value of $x_1$ equal to 20 mm. a practically constant power requirement N.

In this example the piston 15 had an effective diameter $d$ equal to 12 mm., and the dimensions of the linkage means were $a=50$ mm., $b=73$ mm., $L_0=370$ mm., $s=300$ mm., $h_0=215$ mm., $m=75$ mm., $n=300$ mm. The highest pressure $p_{max}$ was set at 250 atmospheres and at $Q_{max}$ the minimum pressure $p_0$ was equal to 80 atmospheres.

As pointed out above, by suitable choice of the preload of the spring 29 the value of the constant pressure $p_{max}$ may be regulated in the range $x=0$ to $x_1$. If the stressing of the spring 29 is further reduced sufficiently, then the value $p_{max}$ becomes constantly smaller and the control range where $p$ is a constant becomes greater at the rate of diminishing the control range where N is a constant. If desired, the adjustment of the spring 29 can be so chosen that the pressure $p$ remains constant during the entire turning of the pump from the maximum oscillating position $x_{max}$ toward zero, so that in this case the described control device does not operate any longer as power regulator for maintaining the power N constant, but rather as a pressure regulator for maintaining the pressure $p$ constant.

Referring further to Fig. 1 it will be quite apparent that the rotatable cylinder block 3 together with valve plate 3a may be swung at an angle $\theta$ with respect to the swash plate 2a so that pistons 3b, 3c perform in the cylinder block upon rotation of shaft 2 and of the swash plate 2a while said cylinder block rotates a reciprocating movement. When the one piston 3c is moved outwardly in the respective cylinder then a pressure medium, such as oil, will be sucked in through conduit 5 connected to valve plate 3a and when the other piston 3b moves into the respective cylinder oil will be pressed from the latter through the corresponding discharge opening of the valve plate into the conduit 16. The piston displacement (swept volume) is proportional to the sin of the angle $\theta$.

The fluid quantity Q to be delivered at a constant number of revolutions is proportional to the displacement of the pistons, and, consequently the delivery quantity Q of the fluid or oil medium is proportional to the sin of the angle $\theta$.

Since $\theta$ is infinitely variable from zero to a maximum then the delivered fluid quantity Q may also be infinitely adjustable from zero to a maximum. If the delivery quantity Q is 25 then the swinging angle of $\theta$ is 25°.

The measuring or control piston 15 fulfills the function of a control slide. This piston is moved on the one hand through the applied pressure indicated by arrow 31 which is produced through springs 22 and 29 and on the other hand through the pressure P produced by the oil pressure coming from the pump. If 31 is equal to P then there exists a state of equilibrium between pressure 31 and pressure P, so that control piston 15 takes up the position as shown in Fig. 1, in which this piston seals off conduits 12 and 13 and also pressure line 16 from discharge opening or outlet 40 (leading to an oil sump).

If, however, the pressure in conduit 16 becomes greater than the pressure indicated by arrow 31, then the piston 15 is moved upwardly and the fluid passes through the conduit 12 into the pressure cylinder 10 and presses against the piston 7 thereof. (Fig. 3.) The pump will then be changed from its position toward its zero position indicated by line 6 and the delivery quantity Q is decreased. As a consequence thereof the pressure is reduced in the system until the control piston 15 assumes again its position of equilibrium.

If the fluid pressure through conduit 16 is smaller than the spring pressure indicated by arrow 31, then the piston 15 is moved downwardly and fluid or oil which is present in cylinder 10 passes through conduit 13 into the discharge opening 40 (Fig. 4). The pump will then be changed in its angular position through the action of spring 11 to increase the volume of piston displacement.

The delivery quantity Q and thus the pressure in the hydraulic system increases until the control piston 15 has again reached its equilibrium or position indicated in Fig. 1.

Fig. 5 explains, as hereinabove stated, how pivot 24 may be slidable for regulation of its position along a supporting surface 41, slide piece 42 carrying pivot 24 and being operatively connected to a threaded spindle 43 for adjusting purposes. To this end, spindle 43 may be moved relative to anchor plate 44 by means of nuts 45, 46, as is well comprehensible, so that the position of the aforesaid lever means and spring arrangement are accordingly changed.

It will be noted that piston 7 whose operation has been hereinabove explained, is connected via a link and pivot 8a, 8b to arm 8.

The plate or piston 28 as hereinabove noted, may be moved or displaced lengthwise of piston rod 28a by means of an adjustment nut 28b, whereby the preload of spring 29 may be varied.

It will thus be seen that according to the present invention there has been provided a hydraulic control device for controlling a hydrostatic drive such as an axial displacement pump which is turnably mounted for regulating the quantity of fluid delivered by the pump, this device including a hydraulic moving means operatively connected with the pump for moving the latter and a hydraulic measuring means for measuring the pressure of the fluid delivered by the pump and communicating with the moving means for actuating the latter according to changes in the pressure, the moving means and measuring means being interconnected by a linkage means which hyperbolically varies the load on the measuring means during actuation of the moving means. The linkage means includes a plurality of arms and a resilient lever means which is inclined with respect to these arms.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A hydraulic device controlling the pressure of a hydraulic operating circuit comprising pressure sensing means arranged in said hydraulic operating circuit for displacement in accordance with variations of said pressure acting thereon, auxiliary pressure circuit means including valve means and moving means, said valve means being operatively connected with said pressure sensing means for displacement thereby to vary the pressure in said auxiliary circuit means, said moving means being automatically movable in dependency to variations of said pressure in said auxiliary circuit means for thereby influencing said pressure in said operating circuit sensed by said sensing means, transmission means comprising pivotable arm means cooperating with said pressure sensing means, lever means hingedly connecting said arm means with said moving means and extending at an acute angle with respect to said arm means, said lever means including spring means tending to displace said pressure sensing means over said arm means against the pressure in said operating circuit acting thereon, said transmission means transmitting the movement of moving means in response to said pressure variations in said auxiliary circuit as a function of the adjustable initial tension of said spring means and of said acute angle to said pressure sensing means, to thereby control said moving means by said pressure sensing means and as a function of said adjustable initial tension of said spring means and of said acute angle between said arm means and said lever means.

2. A hydraulic device controlling the pressure of a hydraulic operating circuit comprising pressure sensing means arranged in said hydraulic operating circuit, auxiliary pressure circuit means including valve means and moving means, said valve means being operatively connected with said pressure sensing means for displacement thereby to vary the pressure in said auxiliary circuit means, said moving means being automatically movable in dependency to variations of said pressure in said auxiliary circuit means for thereby influencing said pressure in said operating circuit sensed by said sensing means, transmission means comprising pivotable arm means cooperating with said pressure sensing means, lever means hingedly connecting said arm means with said moving means and extending at an adjustable acute angle with respect to said arm means, an adjustable spring pressed piston and cylinder means, a bearing carried by said piston and cylinder means, said arm means having an end distant from said lever means pivotably supported by said bearing, said lever means including spring means tending to displace said pressure sensing means over said arm means against the pressure in said operating circuit acting thereon, said transmission means transmitting the movement of moving means in response to said pressure variations in said auxiliary circuit as a function of the adjustable initial tension of said spring means and of said adjustable acute angle to said pressure sensing means, to thereby control said moving means by said pressure sensing means and as a function of said adjustable initial tension of said spring means and of said acute angle between said arm means and said lever means.

References Cited in the file of this patent

UNITED STATES PATENTS

| Number | Name | Date |
|---|---|---|
| 1,418,953 | Martin | June 6, 1922 |
| 2,264,262 | Erbguth | Nov. 25, 1941 |
| 2,291,048 | Lichtenstein | July 28, 1942 |
| 2,343,661 | Glass | Mar. 7, 1944 |
| 2,554,047 | Moon | May 22, 1951 |
| 2,601,830 | Berlyn et al. | July 1, 1952 |
| 2,606,423 | Spencer et al. | Aug. 1, 1952 |
| 2,613,890 | Beman | Oct. 14, 1952 |
| 2,620,772 | McLane | Dec. 9, 1952 |
| 2,637,301 | Burdick | May 5, 1953 |